: US010443756B2

(12) United States Patent
Peterson

(10) Patent No.: US 10,443,756 B2
(45) Date of Patent: Oct. 15, 2019

(54) ACTUATOR WITH TOOTHED PROFILE ENGAGING INCLINED SURFACES FOR SOLENOID OPERATED VALVE

(71) Applicant: FLEXTRONICS AP, LLC, San Jose, CA (US)

(72) Inventor: Matthew Peterson, Ada, MI (US)

(73) Assignee: FLEXTRONICS AP, LLC, San Jose, CA (US)

( * ) Notice: Subject to any disclaimer, the term of this patent is extended or adjusted under 35 U.S.C. 154(b) by 30 days.

(21) Appl. No.: 15/462,525

(22) Filed: Mar. 17, 2017

(65) Prior Publication Data

US 2018/0266583 A1 Sep. 20, 2018

(51) Int. Cl.
| F16K 31/10 | (2006.01) |
| F16K 11/048 | (2006.01) |
| F16K 31/524 | (2006.01) |
| F16K 31/00 | (2006.01) |

(52) U.S. Cl.
CPC ............ F16K 31/10 (2013.01); F16K 11/048 (2013.01); F16K 31/003 (2013.01); F16K 31/52416 (2013.01)

(58) Field of Classification Search
CPC ...... F16K 11/048; F16K 31/10; F16K 31/003; F16K 31/52416; F16K 31/3855
See application file for complete search history.

(56) References Cited

U.S. PATENT DOCUMENTS

| 3,173,646 | A | | 3/1965 | Wilcox | |
| 3,220,695 | A | * | 11/1965 | Jones | E03C 1/23 251/230 |
| 3,678,954 | A | | 7/1972 | Ostwald et al. | |
| 3,780,980 | A | * | 12/1973 | Kallel | F16K 31/10 239/583 |
| 4,771,985 | A | * | 9/1988 | Gross | F16K 31/3855 251/230 |
| 5,599,003 | A | * | 2/1997 | Seemann | H01F 7/124 251/129.2 |
| 6,669,165 | B2 | * | 12/2003 | Burke | F02M 25/0836 251/102 |
| 9,217,511 | B2 | * | 12/2015 | Williams | F16K 31/0606 |
| 2003/0042452 | A1 | | 3/2003 | Burke | |
| 2014/0264113 | A1 | | 9/2014 | Grover | |
| 2015/0059892 | A1 | | 3/2015 | Peterson | |

FOREIGN PATENT DOCUMENTS

WO 2011072759 A1 6/2011

OTHER PUBLICATIONS

Search Report Issued in corresponding WO Application No. PCT/US2018/022685 dated Jun. 4, 2018.

* cited by examiner

Primary Examiner — Eric Keasel
(74) Attorney, Agent, or Firm — Volpe and Koenig, P.C.

(57) ABSTRACT

An actuator for use with an on/off solenoid configured to maintain a position corresponding to the energized state of the solenoid when the solenoid is de-energized. The actuator is comprised of a guide that rotates a selector between one of two positions each time the solenoid is energized. One position of the actuator places the selector in an extended position and the other position of the actuator places the selector in a retracted position. To move the selector between the first and second positions, the solenoid is momentarily energized, and in each position of the selector, the solenoid is de-energized. The actuator can be coupled to a poppet valve to maintain the valve in one of two positions when the solenoid is de-energized.

14 Claims, 5 Drawing Sheets

ACTUATOR WITH TOOTHED PROFILE ENGAGING INCLINED SURFACES FOR SOLENOID OPERATED VALVE

FIELD OF INVENTION

This application is generally related to an actuator for solenoid operated valves and more particularly related to an actuator that can maintain one of two positions with the solenoid in a de-energized state.

BACKGROUND

Solenoid-operated valves are used in a variety of applications, generally to control the flow of fluid, and can be configured to be in a normally-closed or normally-open position when the solenoid is de-energized and in the opposite position when the solenoid is energized. In some applications, solenoid-operated valves are utilized in automobiles in thermal management systems for transmission fluid or engine coolant.

In some thermal management systems, for example transmission fluid or engine coolant, the default, or de-energized, solenoid-operated valve position directs the coolant flow from the engine or transmission to a cooler. Under certain circumstances, for example cold weather starting and initial operation of the automobile, it may be beneficial to bypass the cooler and return the coolant to the engine or transmission to shorten the warm-up period necessary for the fluid to reach optimal operating temperature. Typically this requires the solenoid to remain in the energized state for extended periods of time.

Current solenoids, if adapted for use in some thermal management systems, would require the solenoid to remain in the energized state until operating temperature of the controlled fluid was reached. Maintaining the solenoid in the energized condition can cause the activating coil to undesirably heat up, leading to increased resistance and the associated decrease in current. At a decreased current, the coil may produce a reduced magnetic field causing the solenoid to return to a default position, and thereby prematurely directing the fluid flow to the cooler.

In some cases, for example in energy sensitive applications, it may be impossible, undesirable, or impractical to provide the necessary power to maintain a solenoid-operated valve in the energized state for the required period of time.

Accordingly, the need exists for a solenoid operated valve that overcomes the above noted deficiencies.

SUMMARY

An actuator for a solenoid operated valve is provided which includes a body having first mounting surface, a second mounting surface, and an inner wall defining an axial bore through the body. The actuator also includes a post projecting radially inwardly from the inner wall along a portion of a length of the bore parallel to a longitudinal axis of the bore with a first end adjacent to the second mounting surface, the first end configured to facilitate rotation of the post relative to the body. The actuator also includes a cylindrical selector disposed within the bore adjacent to the second mounting surface for axial displacement and selective rotational displacement. The selector includes a set of bosses disposed on an outer periphery separated from an adjacent boss by a gap. Each boss is formed with a pattern of inclined surfaces on a first axial face directed away from the second mounting surface. The actuator further includes a rotationally fixed cylindrical guide having a toothed profile comprised of a pattern of peaks and valleys distributed around a perimeter of an axial face disposed within the bore for axial displacement and arranged so that the toothed profile engages with the inclined surfaces. The axial displacement of the guide in a first direction away from the first mounting surface axially displaces the selector and the engagement of the toothed profile with the inclined surfaces angularly displaces the selector such that the first end engages a portion of one of the inclined surfaces to rotate the selector alternately between a first selector position in which the post is disposed within the gap between adjacent bosses and a second selector position in which the post remains engaged with a portion of one of the inclined surfaces.

An actuator for use with an on/off solenoid is provided which includes a selector disposed within a bore of the actuator and configured to be axially and rotationally displaced between a first selector position and a second selector position. The actuator also comprises a guide configured to rotate the selector between the first selector position and the second selector position when the solenoid is in a momentarily energized state. The solenoid is de-energized to a de-energized state when the selector is in one of the first selector position and the second selector position. The selector is maintained in the one of the first selector position and the second selector position while the solenoid is in the de-energized state.

A solenoid-operated valve assembly is provided which includes an actuator, for example, the actuators described above. The assembly also includes an electro-mechanical solenoid comprising an armature, a magnetic coil disposed around the armature, and a housing surrounding the magnetic coil. The armature is axially displaceable with respect to the housing beyond a mounting end of the housing between an extended armature position in response to an energized state of the coil and a retracted armature position in response to a de-energized state of the coil, the mounting end of the housing disposed on the first mounting surface. The assembly also includes a valve having a valve body with a first end including a mounting flange, a stem, a first axially sliding valve axially displaceably with respect to the valve stem and a second axially sliding valve disposed on the stem. Both the first axially sliding valve and the second axially sliding valve are configured for displacement within an axial passage in the valve body between a first valve position forming a first flow path and a second valve position forming a second flow path. The valve mounting flange is disposed on the second mounting surface. The coil is momentarily energized to a momentary energized state. The armature extends to axially displace the guide in the first direction to alternately place the selector in the first selector position and the second selector position so that when the coil is de-energized. The valve remains in the one of the first valve position and the second valve position associated with the momentarily energized state.

A method of controlling movement of an actuator of an on/off solenoid is provided which includes energizing the solenoid to an energized state, axially displacing, when the solenoid is in the energized state, a rotationally fixed cylindrical guide and axially and rotationally displacing a selector disposed within a bore of the actuator between a first selector position and a second selector position. The method includes de-energizing the solenoid when the selector is in one of the first selector position and the second selector position and maintaining the selector in the one of the first selector position and the second selector position when the solenoid is in the de-energized state.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
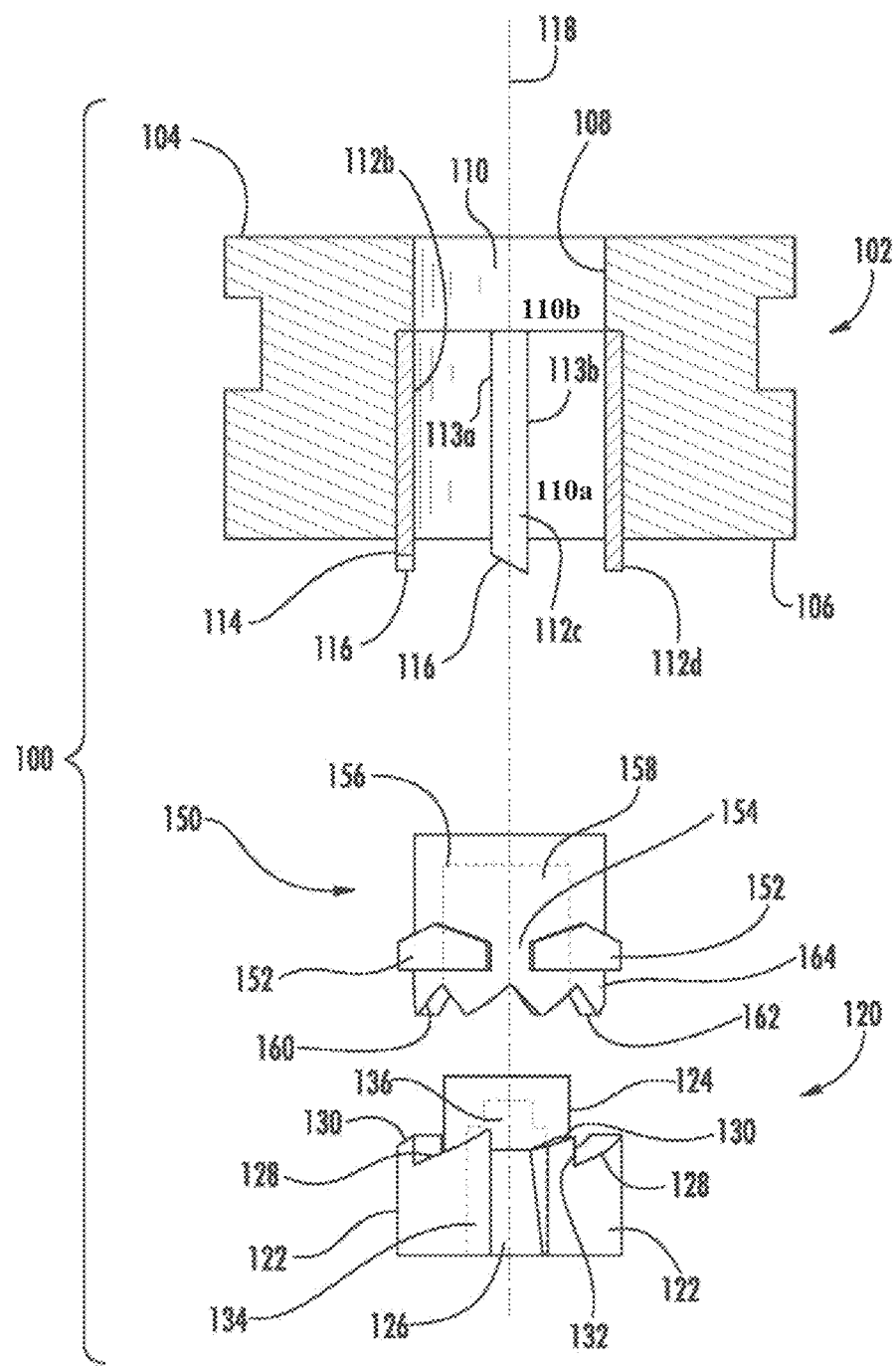
FIG. 1 is an exploded view in partial cross section of an exemplary actuator in accordance with the present disclosure.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to automotive engines and transmissions, the present invention may be modified for a variety of applications while remaining within the spirit and scope of the claimed invention, since the range of the potential applications is great, and because it is intended that the present invention be adaptable to many such variations.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, and c" (where a, b, and c represent the items being listed) means any single one of the items a, b, or c, or combinations thereof. The terminology includes the words specifically noted above, derivatives thereof and words of similar import. All descriptions of rotational direction will be taken along II-II of FIG. 2 unless otherwise noted.

FIG. 1 depicts an actuator 100 in an exploded view with the body 102 in cross section. The body includes first mounting surface 104 at a first axial end and second mounting surface 106 at an opposite axial end. An inner wall 108 defines an axial bore 110 formed through the body 102. The axial bore 110 has a stepped diameter configuration including a stepped-up portion 110a and a stepped-down portion 110b, wherein the stepped-up portion 110a has a greater inner diameter than the stepped-down portion 110b. One or more posts 112, for example posts 112a (which is cut away in the sectional view in FIG. 1 and shown in FIG. 3) and 112b-112d (shown in FIG. 1 and FIG. 2) project radially inwardly from the inner wall 108 and extend at least partially along a length of the bore 110 of the stepped-up portion 110a, each post having opposing longitudinal faces 113a, 113b parallel to the longitudinal axis 118. Embodiment include end portions of posts shaped to facilitate the selector to rotate relative to the body 102 For example, as shown in FIG. 1, first end portion 114 of the posts 112 adjacent to the second axial end includes a beveled end 116. The posts are illustrated as extending beyond the second mounting surface 106 for clarity only. The first end portion 114 of the posts 112 can terminate within the axial bore 110 adjacent to the stepped-down portion 110b. In some embodiments, one or more ends of posts may not be beveled (e.g., rounded edges).

In a preferred embodiment, there are 2 or more posts 112 evenly arranged around the inner wall 108. In a preferred embodiment as shown, there are 4 posts 112b-112d with post 112a understood to be cut away in the view.

The actuator 100 includes a generally cylindrical selector 120 sized to be disposed within the bore 110 of the body 102. A series or set of bosses 122 (2 shown and 2 hidden in FIG. 1) is disposed on an outer periphery 124 of the selector 120 with a channel or gap 126 separating adjacent bosses 122. The gaps 126 are sized to accept the posts 112 and allow free axial motion of the selector in the bore 110. The number of posts 112 corresponds to the number of gaps 126, for example there may be a 1:1 correspondence so the number of posts 112 is the same as the number of gaps 126, as illustrated in FIG. 1 in which there are 4 posts as described above and 4 gaps 126. Embodiments can also include other correspondences, such as for example, 2 posts 112 and 4 gaps 126 for a 2:4 correspondence. In general, any number of posts and gaps may be used, provided that when one post is aligned with a gap, the remaining posts are also aligned with a gap to allow free axial displacement of the selector within the bore.

When the posts 112 are received within the gaps 126, the selector 120 is restrained from rotational displacement within the body 102.

A pattern of inclined surfaces, including inclined surfaces 128, 130, is formed on an axial face of each boss 122. As illustrated, the surfaces 128, 130 are discontinuous and may have different slopes, or inclinations, with respect to the longitudinal axis 118. The inclined surfaces may include an axially aligned surface, or axial step 132, between one end of surface 128 and one end of surface 130, where it is understood that an end of a surface (e.g., 128, 130) may mean either the end or the beginning of the inclined surface. As illustrated in FIG. 1, the sloped surfaces 128, 130 are generally sloped in the same direction so that both inclined surfaces 128, 130 advance upward (as drawn) in the same angular direction around the perimeter of the selector 120. The inclined surfaces (e.g., 128, 130) may be linear or curved, or may include one or more linear portions and one or more curved portions.

The axial face opposite the inclined surfaces is generally planar and may be open to an interior void 136 bounded by wall 134 which, in a preferred embodiment, is cylindrical in shape. The interior void may have a uniform diameter or may have a reduced portion as shown.

The selector 120 maybe formed from any suitable material such as metal or plastic. In a one embodiment, the selector 120 is formed from polyoxymethylene, or an alloy of polyoxymethylene.

The actuator 100 includes a cylindrical guide 150 sized to be disposed within the bore 110 of the body 102 for free axial displacement but is rotationally fixed by engagement of passages 154 between radially outward projections 152 with the posts 112. Interior wall 156 forms a generally hollow interior 158 sized to accept the central portion 124 of the selector 120 with clearance to allow relative rotation of the selector 120 with respect to the guide 150.

A surface with a toothed profile 160 is formed around the outer perimeter of the axial end of the guide 150 opened to the hollow interior 158. The toothed profile 160 is formed from a symmetric series of peaks 162 and valleys 164.

The guide 150 maybe formed form any suitable material such as metal or plastic. In a preferred embodiment, the guide 150 is formed from polyoxymethylene, or an alloy of polyoxymethylene.

Figure 2:
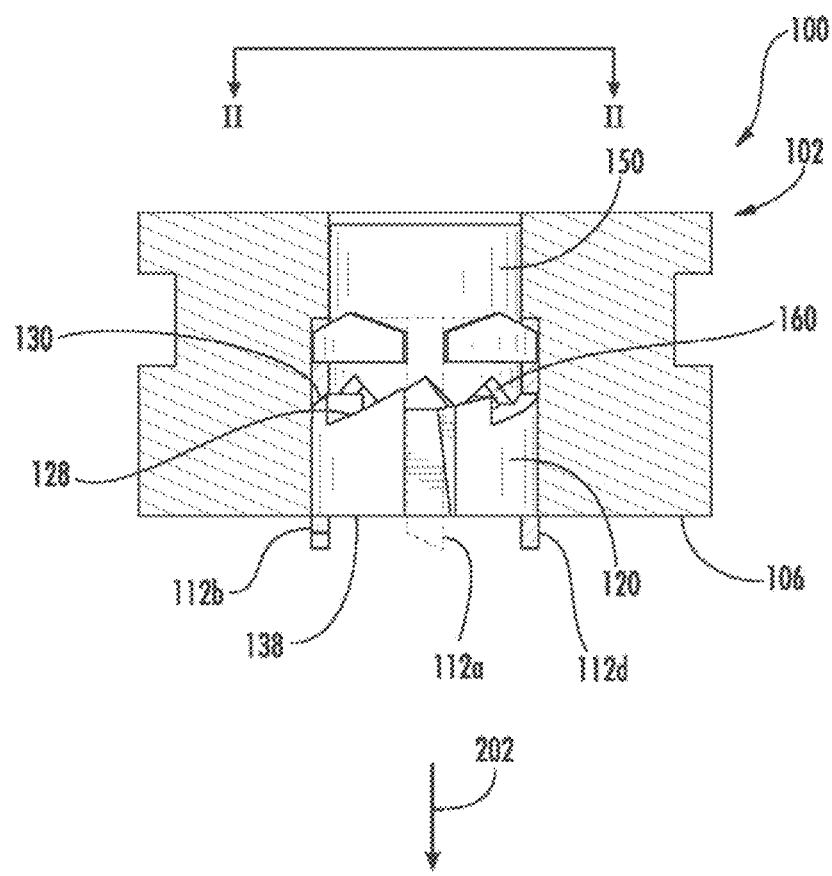
FIG. 2 is a partial sectional view of the exemplary actuator shown in FIG. 1 in a first selector position.
Figure 3:
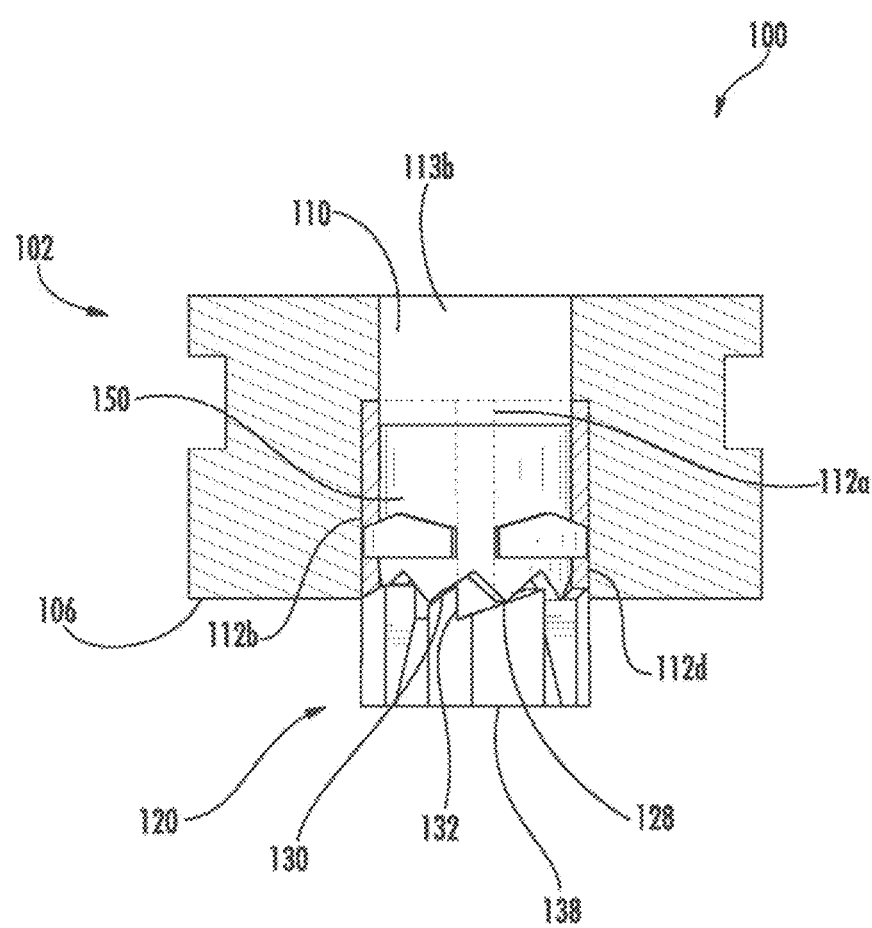
FIG. 3 is a partial sectional view of the exemplary actuator shown in FIG. 1 in a second selector position.

FIG. 2 illustrates the actuator 100 in a first configuration in which the selector 120 is in a first selector position. FIG. 3 illustrates the actuator 100 in a second configuration in which the selector 120 is in a second selector position. The selector 120 is rotated between the first selector position and the second selector position. When the selector 120 and guide 150 are assembled in the body 102 to form the actuator 100 as illustrated in FIG. 2, the selector 120 is disposed adjacent to the second mounting surface 106 and the guide 150 is disposed on the selector 120 with the toothed profile 160 engaged with the inclined surfaces 128, 130. As shown in FIG. 1, the posts 112 are disposed in the passages 154 between projections 152 of the guide 150 and as well as being disposed in the gaps 126 between adjacent bosses 122. In this selector position, the axial face 138 of the selector 120 opposite the inclined surfaces 128, 130 is flush with, or substantially flush with, the second mounting surface 106.

As shown in FIG. 3, posts 112a-112d are engaged with a portion of the inclined surfaces 128, 130. For ease of illustration, post 112a is shown in phantom. Post 112a represents the properly positioned post in the portion of the axial bore 110 that has been removed. Post 112c is hidden from view by post 112a. In a one embodiment, posts 112b-112d may also be engaged. Embodiments may include any number of posts being engage with any number of inclined surfaces.

A portion of a beveled end 116 of a post 112a abuts against a portion of the inclined surface 128 which causes the selector 120 to extend beyond the second mounting surface 106. Longitudinal face 113b abuts against a portion of the axial step 132 to resist rotation of the selector 120 with respect to the body 102.

In on embodiment, posts 112b-112d are engaged with corresponding inclined surfaces 128, 130 in a manner similar to that described for post 112a.

In transitioning from the actuator's first configuration of FIG. 2 to the second configuration of FIG. 3, the guide 150 and the selector 120 are axially displaced in a direction 202 as illustrated in FIG. 2. The toothed profile 160 and the inclined surfaces 128, 130 are configured to urge rotation of the selector 120 in a counterclockwise (CCW) direction with respect to the body 102 when viewed from along II-II. However, angular displacements of the guide 150 and selector 120 with respect to the body 102 are prevented, or substantially prevented, by engagement of the posts 112 in the passages 154 of the guide 150 and the gaps 126 of the selector 120.

Upon axial displacement of the selector 120 in direction 202 sufficient to disengage the posts 112 from the gaps 126, while maintaining the posts 112 in the passages 154, the interaction of the toothed profile 160 and the inclined surfaces 128, 130 urges the selector 120 to rotate CCW with respect to the body 102 and the guide 150. The CCW rotation places the inclined surface 128 below (as drawn) the beveled tip 116. The beveled tip 116 and the inclined surface 128 are configured to urge the selector 120 to rotate in a CCW direction alone, or in conjunction with the interaction between the toothed profile 160 and the inclined surfaces 128, 130. Rotation of the selector 120 with respect to the guide 150 is interrupted as the longitudinal surface 113b abuts the axial step 132. In this arrangement, the axial face 138 of the selector 120 is spaced apart from the second mounting surface 106 and will remain in this selector position even if subjected to a force applied in a direction opposite to arrow 202.

In the actuator's second configuration shown at FIG. 3, an axial displacement of the selector 120 in the direction of arrow 202 at least as great as the height of the axial step 132, while maintaining the engagement of the passages 154 and the posts 112, frees the selector for additional rotation with respect to the guide 150. The toothed profile 160 and the inclined surfaces 128, 130 cooperate to advance the selector 120 in the CCW direction, placing the inclined surface 130 below (as drawn) the beveled tip 116. The beveled tip 116 and the inclined surface 130 are configured to urge the selector 120 to rotate in a CCW until the posts 112 are aligned with the gaps 126. When aligned, the posts 112 may be received within the gaps 126 and the selector 120 is free to move axially in a direction opposite arrow 202 to return to the first configuration of FIG. 2.

The inventors have observed that the actuator described above, when coupled with a solenoid and a poppet valve, may be particularly useful for automotive applications, for example in engine or transmission cooling systems. The solenoid-operated valve assembly 400 may be beneficially applied to systems when the valve remains in one of two valve positions for extended periods of time with limited power consumption.

Figure 4:
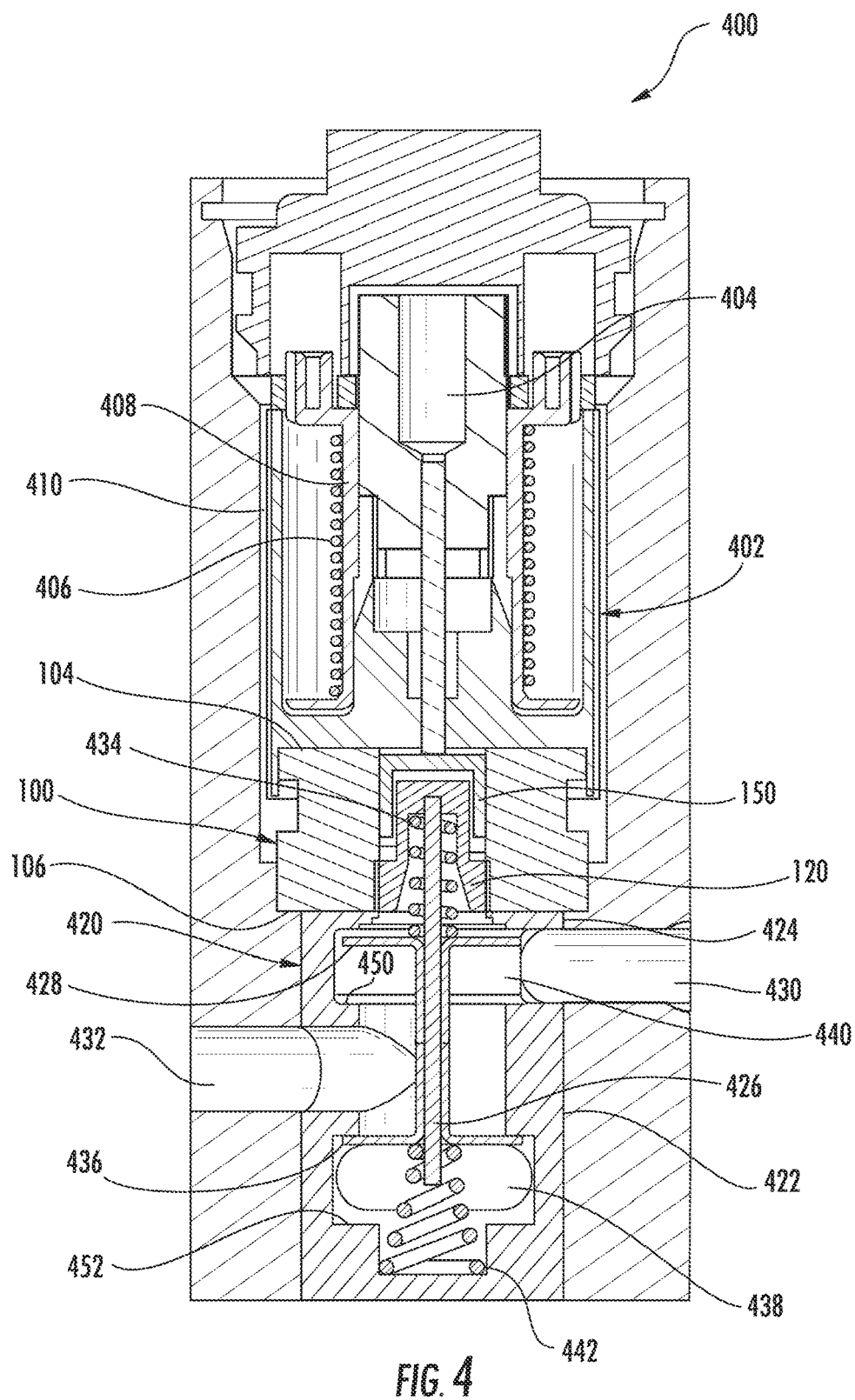
FIG. 4 is a sectional view of a solenoid-operated valve assembly including the actuator shown in FIG. 2.
Figure 5:
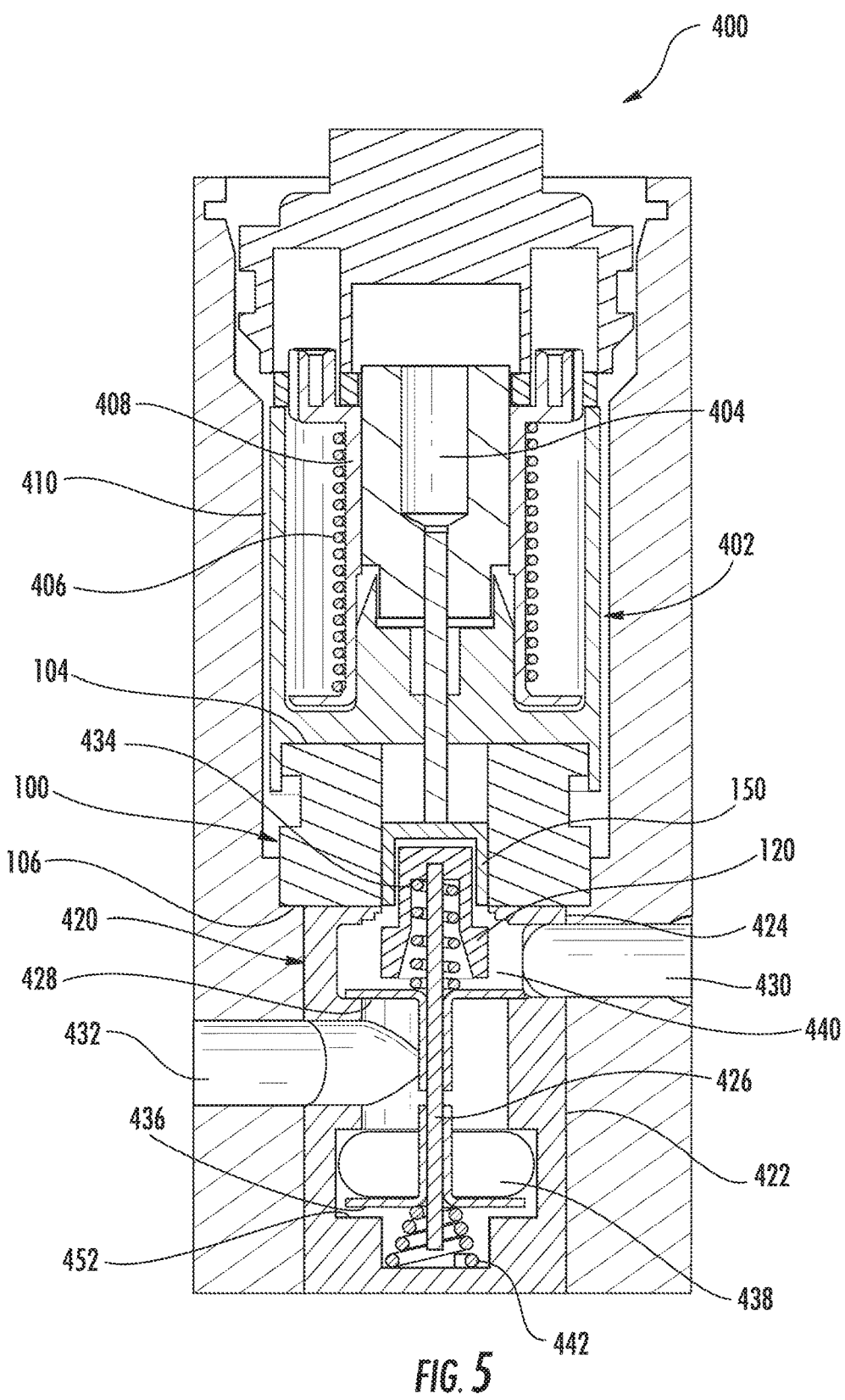
FIG. 5 is a sectional view of the solenoid-operated valve assembly including the actuator shown in FIG. 3.

FIG. 4 is a sectional view of a solenoid-operated valve assembly 400 including the actuator 100 in the configuration shown in FIG. 2. FIG. 5 is a sectional view of the solenoid-operated valve assembly 400 including the actuator 100 in the configuration shown in FIG. 3. A non-limiting embodiment of the solenoid-operated valve assembly 400 including the actuator 100 is now described using FIGS. 4 and 5. The assembly 400 includes a solenoid 402 disposed on the first mounting surface 104 of the actuator 100. The solenoid 402 comprises a magnetic coil 406 wound around a bobbin 408 with an armature 404 disposed within the bobbin 408 for axial displacement with respect to the housing 410 surrounding the coil 406. Power supplied to the coil 406 induces a magnetic field inside the bobbin 408 and causes axial displacement of the armature 404 between a first armature position of FIG. 4 and a second armature position in which the armature 404 is displaced downwardly as shown.

A valve, for example a poppet valve 420, has a valve body 422 with a first end having a mounting flange 424 disposed on the second mounting surface 106. A first end of stem 426 extends into void 136 formed in the selector 120. First valve disk 428 is disposed on the stem 426 within axial passage 440 within the valve body 422. A resilient element, for example spring 434, is disposed between the first valve disk 428 and the selector 120 under a compressive load to apply an upward force as drawn to the guide 150 through the selector 120. When the spring 434 is positioned as shown in the configuration in FIG. 4, spring 434 provides no force or an upward force against 120 and 150. When the spring 434 is positioned as shown in the configuration in FIG. 5, spring 434 provides a downward force to valve disk 428. The upward force that may be provided by the spring 434 in the position shown in FIG. 4 is less than the downward force provided by the spring 434 in the position shown in FIG. 5. The spring 434 facilitates over-travelling of the valve disc 428 during switching states. Valve disc 436 is fixed to the stem 426 while valve disc 428 is spaced from stem 426 a distance sufficient facilitate movement relative to stem 426 while remaining substantially parallel to stem 426 to prevent leakage.

A second valve disk 436 is disposed on the stem 426 in axial passage 440 with a resilient element, for example spring 442, disposed between the second valve disk 436 and a portion of the valve body 422 under a compressive load to apply an upward as drawn force (i.e., towards the mounting flange 424) to the second valve disk 436.

First and second valve disks 428, 436 are axially displaceable within the axial passage 440 between a first valve position to form a first flow path and a second valve position to form a second flow path. When the valve disks are positioned as shown in the configuration at FIG. 4, first inlet 430 is in fluid communication with outlet 432 and second inlet 438 is closed to outlet 432. When the valve disks are positioned as shown in the configuration at FIG. 5, second inlet 438 is in fluid communication with outlet 432 and first inlet 430 is closed to outlet 432.

The inventors have noted that either the first configuration of FIG. 4 or the second configuration of FIG. 5 can be maintained without maintaining power to the solenoid 402 in the solenoid-operated valve assembly 400. A momentary application of power to the coil 406 depends on the response time of the solenoid 402, determined by, for example, the stroke of the armature 404, inductance of the coil 406, and the preload of spring 442. For example, the inventors have determined that an amount of time of less than 1 sec. (e.g., a range of about 20 msec to about 50 msec) is sufficient to displace the actuator 100 from the position of FIG. 2 (corresponding with the assembly position of FIG. 4) to the second position of FIG. 3 (corresponding with assembly position of FIG. 5).

The inventors has observed that sufficient axial displacement of the selector 120 to engage and disengage the posts 112 from the inclined surfaces 128, 130 may be achieved in a non-limiting example by allowing axial displacement of the stem 426 with respect to the first valve disk 428 under certain conditions. For example, in transitioning from the first configuration of FIG. 4 to the second configuration of FIG. 5, as the guide 150 and selector 120 move toward the valve body 422, the valve disk 428 approaches, and eventually contacts the valve seat 450 before second valve disk 436 contacts surface 452. If the selector 120 has not achieved sufficient axial travel to engage or disengage the inclined surfaces 128, 130, a slip condition between the stem 426 and the first valve disk 428 can allow further axial travel of the selector 120 as the spring 434 compresses.

Thus an actuator and solenoid-operated valve assembly are provided herein. The disclosed actuator and valve assembly may advantageously increase the reliability and accuracy of flow control valves and reduce the power consumption of flow control systems by providing direct control of flow control valves with only momentary application of power to the solenoid. Accordingly, overall system efficiency and reliability may be achieved.

Having thus described various methods, configurations, and features of the present actuator and solenoid-operated valve assembly in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An actuator for a solenoid operated valve, the actuator comprising:
    a body including a first axial end, a second axial end, and an inner wall defining an axial bore through the body, the axial bore comprising a stepped diameter including a stepped-up portion and a stepped-down portion of the axial bore, wherein the inner diameter of the stepped-up portion is greater than the inner diameter of the stepped-down portion;
    at least one post located within the stepped-up portion of the axial bore and projecting radially inward from the inner wall along a portion of a length of the axial bore parallel to a longitudinal axis of the axial bore, the post comprising a first end located distal to the stepped-down portion of the axial bore and second end located adjacent to the stepped-down portion of the axial bore;
    a cylindrical selector disposed within the axial bore, and configured for axial displacement and selective rotational displacement, the cylindrical selector including a plurality of bosses and at least one gap, wherein
        the plurality of bosses is disposed on an outer periphery of the cylindrical selector,
        each boss of the plurality of bosses is separated from an adjacent boss by a gap of the at least one gap, and
        each boss of the plurality of bosses is formed with a pattern of inclined surfaces on a first axial face and directed towards the stepped diameter; and
    a cylindrical guide disposed within the axial bore, rotationally fixed and configured for axial displacement, the cylindrical guide comprising a plurality of outward projections, at least one passage, and a toothed profile comprised of a pattern of peaks and valleys distributed around a perimeter of an axial face facing the cylindrical selector and arranged so that the toothed profile engages with the inclined surfaces, wherein
        the outward projections extend radially outward from the cylindrical guide such that an inner diameter of the cylindrical guide at the outward projections is greater than the inner diameter of the stepped-down portion, wherein
    axial displacement of the cylindrical guide in a first direction away from the stepped-down portion of the axial bore axially displaces the cylindrical selector alternately between a first selector position in which each post of the at least one post is disposed within a corresponding gap of the at least one gap such that the cylindrical selector is rotationally fixed, and a second selector position in which each post of the at least one post is disengaged from the corresponding gap and is engaged with a portion of one of the inclined surfaces.

2. The actuator according to claim 1, further comprising:
    the at least one post includes a plurality of posts evenly angularly spaced along the inner wall of the stepped-up portion; and
    the at least one gap includes a plurality of gaps,
    wherein a number of posts corresponds with a number of gaps.

3. The actuator according to claim 2, wherein when the cylindrical selector is in the first selector position, each post of the plurality of posts is received in a corresponding gap of the gaps.

4. The actuator according to claim 1, wherein the pattern of inclined surfaces includes a pattern of discontinuous inclined surfaces comprising a first inclined surface and a second inclined surface with an axially aligned step between an end of the first inclined surface and a beginning of the second inclined surface.

5. The actuator according to claim 4, wherein the first inclined surface and the second inclined surface are axially advancing in a same angular direction.

6. The actuator according to claim 4, wherein a portion of a longitudinal face of each post abuts a portion of the axially aligned step of each pattern of discontinuous inclined surfaces when the cylindrical selector is in the first selector position.

7. The actuator according to claim 1, wherein engagement of the toothed profile with the inclined surfaces angularly displaces the cylindrical selector such that the first end of the post engages a portion of a corresponding inclined surface to rotate the cylindrical selector alternately between the first selector position and the second selector position.

8. The actuator according to claim 1, wherein the plurality of outward projections is spaced a distance from the toothed profile.

9. The actuator according to claim 1, wherein
the plurality of outward projections is separated from an adjacent outward projection by a passage of the at least one passage, and
each post of the at least one post is configured to be disposed within a corresponding passage of the at least one passage.

10. A solenoid-operated valve assembly comprising:
the actuator according to claim 1;
an electro-mechanical solenoid comprising an armature, a magnetic coil disposed around the armature, and a housing surrounding the magnetic coil, the armature being axially displaceable with respect to the housing beyond a mounting end of the housing between an extended armature position and a retracted armature position, the mounting end of the housing disposed on the first axial end; and
a valve comprising a valve body and a valve stem configured for displacement between a first valve position forming a first flow path and a second valve position forming a second flow path,
wherein, when the coil is momentarily energized to a momentarily energized state, the armature extends to axially displace the cylindrical guide in the first direction to alternately place the cylindrical selector in at least one of the first selector position or the second selector position so that when the coil is de-energized, the valve remains in one of the first valve position or the second valve position associated with the momentarily energized state.

11. The assembly according to claim 10, wherein the valve further comprises:
a first resilient element disposed around the valve stem between the first valve disk and the cylindrical selector configured to apply an axial force to the guide through the cylindrical selector against the displacement of the armature to the extended armature position, and
a second resilient element disposed around the valve stem between the second valve disk and a second end of the valve housing biasing the second valve disk towards the mounting flange.

12. The solenoid-operated valve assembly of claim 10, wherein the extended armature position is in response to an energized state and the retracted armature position is in response to a de-energized state.

13. The solenoid-operated valve assembly of claim 10, wherein:
a first end of the valve body includes a mounting flange disposed on the second axial end, and
the valve stem comprises a first valve disk displaceable with respect to the valve stem and a second valve disk disposed on the valve stem, and both the first valve disk and the second valve disk are configured for displacement within an axial passage of the valve body between the first valve position and the second valve position.

14. A method of controlling movement of the actuator of claim 10, the method comprising:
energizing the solenoid to an energized state;
axially displacing the cylindrical guide when the solenoid is in the energized state,
axially and rotationally displacing the cylindrical selector from one of the first selector position or the second selector position to the second selector position or the first selector position, respectively when the solenoid is in the energized state;
de-energizing the solenoid to a de-energized state when the cylindrical selector is in one of the first selector position or the second selector position; and
maintaining the cylindrical selector in one of the first selector position and the second selector position when the solenoid is in the de-energized state.

* * * * *